US008571400B2

(12) United States Patent
King

(10) Patent No.: US 8,571,400 B2
(45) Date of Patent: Oct. 29, 2013

(54) METHODS AND APPARATUS FOR FLASH INTENSITY VALUE MANAGEMENT IN A PHOTOGRAPHIC ENVIRONMENT

(76) Inventor: Kevin James King, Vancouver, WA (US)

( * ) Notice: Subject to any disclaimer, the term of this patent is extended or adjusted under 35 U.S.C. 154(b) by 257 days.

(21) Appl. No.: 13/204,202

(22) Filed: Aug. 5, 2011

(65) Prior Publication Data

US 2012/0033959 A1  Feb. 9, 2012

Related U.S. Application Data

(60) Provisional application No. 61/371,160, filed on Aug. 5, 2010.

(51) Int. Cl.
*G03B 15/03* (2006.01)
(52) U.S. Cl.
USPC ............. 396/56; 396/157; 396/164; 396/182; 396/201
(58) Field of Classification Search
USPC .................. 396/4, 56, 157, 164, 182, 201
See application file for complete search history.

(56) References Cited

U.S. PATENT DOCUMENTS

| | | | | |
|---|---|---|---|---|
| 4,457,602 A * | 7/1984 | Mizokami | ...................... | 396/161 |
| 5,614,970 A * | 3/1997 | Takagi et al. | ................. | 396/164 |
| 6,404,987 B1 | 6/2002 | Fukui | | |
| 7,697,837 B2 * | 4/2010 | Kosaka | .......... | 396/164 |
| 8,041,203 B2 * | 10/2011 | Kunishige et al. | .............. | 396/56 |
| 2008/0304817 A1 * | 12/2008 | Aherne | .......... | 396/164 |
| 2009/0129765 A1 | 5/2009 | King | | |
| 2010/0008658 A1 | 1/2010 | King | | |
| 2010/0124412 A1 | 5/2010 | King | | |
| 2010/0209089 A1 | 8/2010 | King | | |
| 2012/0033959 A1 * | 2/2012 | King | ............. | 396/157 |
| 2013/0089313 A1 * | 4/2013 | Clark | ............ | 396/164 |

* cited by examiner

*Primary Examiner* — W B Perkey

(57) ABSTRACT

Methods for providing a flash management feature ("FMF") in a camera system include obtaining a flash intensity value calculated for a flash device by a camera, saving the calculated flash intensity value in memory, accepting a user-provided adjustment of the calculated value, saving the adjusted flash intensity value in a memory, and providing, when the camera transmits the calculated value to the flash device for use during image acquisition, the adjusted value to the flash device instead of the calculated value. A communication device to provide a FMF includes a microprocessor configured to obtain a calculated flash intensity value from a camera, a memory, and a user interface configured to display and allow a user to adjust the calculated value. The microprocessor stores the adjusted flash intensity value in memory, and signals the flash device to emit light at the adjusted value during image acquisition by the camera.

20 Claims, 5 Drawing Sheets

METHODS AND APPARATUS FOR FLASH INTENSITY VALUE MANAGEMENT IN A PHOTOGRAPHIC ENVIRONMENT

RELATED APPLICATION

This application claims the benefit of U.S. Provisional Application No. 61/371,160, filed on Aug. 5, 2010, the entire disclosure of which is incorporated herein by reference for all purposes.

TECHNICAL FIELD

This disclosure relates to flash control in photographic systems, and in particular to methods and apparatus for managing a flash intensity value for a flash device emission in a camera system.

BACKGROUND

Many cameras are equipped with a light metering system, such as TTL ("through-the-lens") metering, by which the camera measures light levels in a photographic environment, and/or related to a photographic subject in the environment. In TTL metering, the camera measures light through its taking lens, such as by means of an internal light meter.

Such light metering systems may be used to determine appropriate flash settings for use during image acquisition, a process sometimes referred to as "flash metering." In TTL flash metering, prior to image acquisition, one or more pre-flash emissions (or "pre-flashes") are requested by the camera, typically by means of electronic signals sent by the camera to a flash device. In response, the flash device emits a known quantity of light. Light from the pre-flash emission, along with light from other sources in the photographic environment, may bounce off the photographic subject and pass through the camera's taking lens en route to a light meter (for example, a defined field of imaging sensors). Based on the intensity of light detected, the camera determines whether the intensity of the flash emission for image acquisition (sometimes called the "main flash") should be less than, the same as, or greater than the intensity of light used in the pre-flash emission. Generally, the timing of TTL flash metering is such that the pre-flash precedes the main flash by 10-150 milliseconds, but could be as short as 100 microseconds.

The above explanation of TTL flash metering is somewhat simplified, as various techniques have been developed, especially in digital cameras, such as different ways in which a pre-flash is used, how incident light is measured, and/or the manner in which a flash intensity value may be determined. For example, Canon has developed TTL flash metering systems such as A-TTL ("advanced through-the-lens"), E-TTL ("evaluative through-the-lens," as described in Canon's U.S. Pat. No. 6,404,987, the complete disclosure of which is hereby incorporated by reference), and E-TTL II, whereas Nikon has developed D-TTL, iTTL, and so forth.

Regardless of the exact technique or protocol employed, the TTL flash metering process is automatic and does not provide for or allow user adjustment of the flash intensity value that is calculated by the camera, or even inform the user of the calculated flash intensity value. Rather, once the flash intensity value is calculated, it is usually almost immediately signaled to the flash device, and then discarded once image acquisition has occurred (e.g. a photograph is taken). The automatic, rapid nature of the TTL flash metering process allows it to be repeated anew every time image acquisition occurs, and is thought to better ensure that the amount of light illuminating the photographic subject is correct despite even minute changes in the photographic environment from one shot to the next.

Some cameras enabled with TTL flash metering also have a flash exposure lock ("FEL") feature that may allow such a flash intensity value (i.e. one calculated by the camera based on exposure data gathered from a pre-flash) to be retained for a short period of time, such as 15-20 seconds, to allow a user to prepare for and then take several shots using the same flash intensity. However, FEL does not allow user adjustment of flash settings, and the calculated flash intensity value is discarded after the short period of time elapses once shooting is complete. Another somewhat related feature implemented in some cameras is known as flash exposure compensation ("FEC"), which may allow a user to instruct the camera to increment the amount of exposure compensation that a camera makes to an image acquired thereby, but FEC does not allow a user adjust the calculated flash intensity value used during image acquisition. Neither FEL nor FEC, nor any TTL flash metering system, provide feedback to the user as to the flash intensity value that is calculated by the camera for use during image acquisition. Indeed, because the pre-flash emitted by a flash device may be so close in time to the main flash emission so as to be indistinguishable from it, a user may have no indication that a flash intensity value is even calculated.

Rather, user control of various flash settings (including, in some cases, flash intensity) is typically achieved, if at all, via controls on more sophisticated flash devices. Generally, when used in conjunction with a camera, such as by being directly connected to the camera or set up as a remote flash to be controlled by either the camera or a flash device connected thereto, such a flash device may be switched between an automatic (e.g. TTL) mode in which it is slaved to another device (typically, the camera) and a manual flash mode in which a user may set certain flash settings for the flash device.

However, manually setting flash settings on a flash device does not allow a user to leverage the camera's TTL flash metering system, and instead requires the user to rely on guesswork and/or experience in order to predict an appropriate or desired flash intensity for image acquisition. This challenge is further complicated in situations in which more than one flash device is used to provide illumination of a photographic subject, and/or if a user would like to replicate lighting conditions used for an earlier photograph (such as one taken an hour before, or a day, or even longer).

SUMMARY

The methods and apparatus disclosed herein may provide a feature that may be referred to as a flash management feature (or "FMF") for use with a camera system that includes a camera that cooperates with at least one flash device to acquire an image of a photographic subject. In some embodiments, FMF may utilize a user interface that displays, and/or allows a user to adjust, a flash intensity value that is calculated by the camera for a flash device for use during image acquisition, based on a pre-flash procedure or another method involving a light metering system employed by the camera to assess incident light in a photographic setting. In such embodiments, the FMF may provide the user-adjusted flash intensity value (also referred to herein simply as "adjusted flash intensity value") to the flash device, instead of the calculated flash intensity value, for use during subsequent image acquisition by the camera.

Further, in some embodiments, the FMF may allow an adjusted flash intensity value to be saved in a memory or otherwise recorded, for example for retrieval and re-use (and/ or further adjustment) by a user at a later time. In some embodiments, the FMF may selectively disable the camera from, or otherwise prevent, conducting a pre-flash procedure after an adjusted flash intensity value has been provided to the flash device for image acquisition. In other embodiments, the camera may continue to conduct pre-flash procedures and/or calculate flash intensity values based on exposure data gathered by a light metering system, and the FMF may monitor such values while an adjusted flash intensity value is in use, substituting a calculated flash intensity value if a predetermined threshold difference in the two values exists.

A FMF as described herein may be provided by means of illustrative methods of controlling a flash intensity value calculated by a camera that may include: obtaining, subsequent to image acquisition by a camera, the camera-calculated flash intensity value used by a flash device during the image acquisition, followed by saving the calculated flash intensity value in a memory, then making the calculated flash value intensity available to a user to be adjusted. After accepting a user-provided adjustment of the calculated flash intensity value, such methods may further include saving the adjusted flash intensity value in a memory, and then providing, for use during subsequent image acquisition by the camera, the adjusted flash intensity value to the flash device instead of the calculated flash intensity value. The adjusted flash intensity value may then be used by the flash device during subsequent image acquisition.

Example configurations of components that may provide a FMF may include a communication device for use with a camera system as described above, which may include a microprocessor adapted to obtain a calculated flash intensity value from the camera, a memory operably coupled to the microprocessor, a user interface configured to display the calculated flash intensity value and allow a user to selectively adjust the calculated flash intensity value. In such a communication device, the microprocessor may be configured to store an adjusted flash intensity value in the memory, and signal the flash device to emit light at the adjusted flash intensity value during subsequent image acquisition by the camera.

Other example configurations of components that may provide a FMF may include a camera for use with a flash device, wherein the camera may include a light meter configured to gather exposure data related to a photographic subject resulting from a pre-flash emission of the flash device, a microprocessor configured to calculate, based on the exposure data, a first flash intensity value for the flash device for image acquisition of the photographic subject by the camera, a memory operably coupled to the microprocessor and configured to store the calculated flash intensity value, and a user interface configured to display the first calculated flash intensity value and allow a user to selectively adjust the first calculated flash intensity value. In such a camera, the microprocessor may be further configured to store the adjusted flash intensity value in the memory, and/or to signal the flash device to emit light at the adjusted flash intensity value during image acquisition by the camera.

The concepts, features, methods, and component configurations briefly described above are clarified with reference to the accompanying drawings and detailed description below.

DETAILED DESCRIPTION

Figure 1:
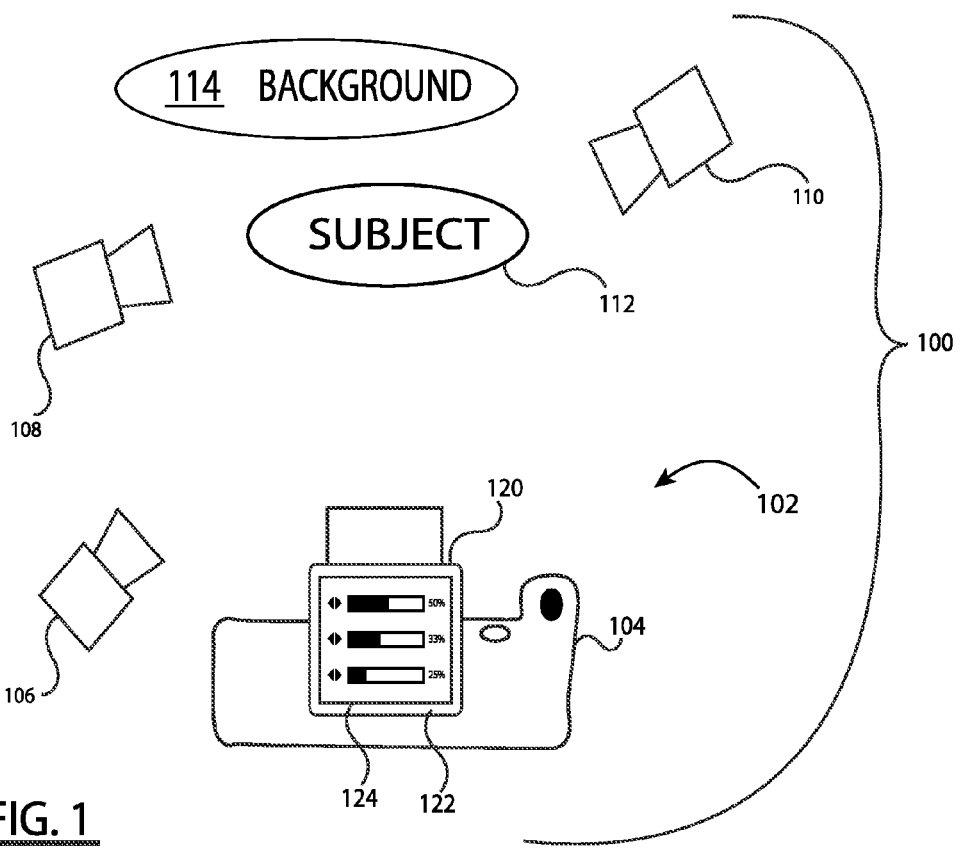
FIG. 1 shows a schematic view of an example photographic setup in which a camera system includes a camera, and three remote flash devices, and in which an illustrative embodiment of a communication device configured to provide a FMF in accordance with aspects of the present disclosure is shown to be coupled to the camera.

FIG. 1 is a schematic view illustrating an example photographic setup, designated generally as 100, in which a camera system 102 is shown to include a camera 104 and three flash devices 106, 108, and 110 set up remotely from the camera, with which the camera is configured to communicate (such as by electrical signals sent via wired connections, and/or wirelessly, for example, via optical signals, radio signals, and so forth). As such, although not specifically shown, camera system 102 may further include suitable accessory components and devices as needed to achieve communication among the various components of the camera system. Examples of wireless communication methods and devices configured to establish and/or facilitate wireless communication by radio signals in a camera system are disclosed in Applicant's co-pending U.S. Patent Application Pub. Nos. US2009012975, US20100008658, US20100124412, and US20100209089, the complete disclosures of which are hereby incorporated by reference.

The camera and flash devices of camera system 102 are arranged with respect to a photographic subject 112, which is positioned against a background, designated generally as 114, for image acquisition of the subject by the camera. The relative and/or absolute flash output settings of the flash devices used in a photographic setup may affect the exposure of a photographic composition, such as that of subject 112 against background 114. Photographic setup 100 may represent a three-point lighting setup in which remote flash devices 106, 108, and 110 may each be a single flash device or a group of flash devices functioning as a unit. For example, flash device 106 may be configured to shine more or less directly at the subject and thus may represent a key light, to function as the main illuminator of the subject. Continuing this example, flash device 108 may represent a fill light intended to illuminate shadowy areas of the photographic composition, and flash device 110 may represent a rim light (also called a kick light or kicker light) intended to illuminate the back of the subject to create a thin outline of light around the subject. Other photographic setups or systems may include a different configuration of flash devices, such as to illuminate objects or areas in the background, different features of the subject, and so forth, including setups in which a flash device incorporated within and/or coupled to the camera may be used for illumination.

Camera 104 may be configured to gather exposure data related to the subject 112, such as by means of a light metering system. For example, an E-TTL or similar system may be resident in camera 104, in which case the camera may signal one or more pre-flashes, such as to be emitted from one or more of the flash devices 106, 108, and 110. The resulting exposure data related to the photographic subject from the pre-flash is read by the light metering system, and the camera calculates a flash intensity value based thereon, for one or more of the flash devices to use during subsequent image acquisition by the camera. Typically, in setups using multiple flash devices for illumination, a pre-flash from each will be requested by the camera, simultaneously and/or in some predetermined sequence, and the camera will correspondingly calculate a flash intensity value for each flash device based on readings from the light metering system.

Camera 104 is shown to have an illustrative embodiment of a communication device 120 coupled thereto, such as via the hotshoe connector of the camera, or in some other manner. The communication device 120 provides a flash management feature ("FMF"), and includes an example user interface 122, shown as a touchscreen display 124 that is configured to visually display, and accept user-provided adjustments of, the flash intensity values calculated by the camera 104.

Figure 2:
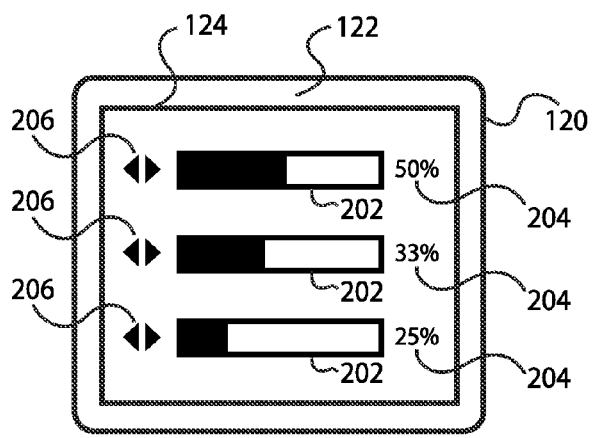
FIG. 2 is a schematic view illustrating an example user interface that may be presented by the communication device of FIG. 1.

FIG. 2 shows user example interface 122 in greater detail, in which the calculated flash intensity value for each of the three flash devices of camera system 102 is shown to be displayed on the touchscreen display 124 as a partially filled bar 202 along with a numerical indicator 204, which may, for example, collectively represent the percentage of each flash device's maximum intensity that corresponds to the respective calculated flash intensity value.

Interface 122 is configured to allow a user to selectively adjust the calculated flash intensity value, such as by means of touch-sensitive arrow icons 206 displayed on the touchscreen display. While an adjustment is being made, a corresponding change in the appearance of the displayed intensity values may occur, for example to provide clear interactive feedback to the user making the adjustment. The interface may optionally enable the user to make adjustments in any suitable manner, such as adjusting each value separately, adjusting two or more values simultaneously, adjusting two or more values proportionately, adjusting ratios of two or more values, and so forth. As such, the interface may include additional and/or different display features or configurations of visual indicia as needed to indicate different adjustment options and intensity values, and so forth, as a matter of design choice. Moreover, other embodiments may include any variety of features or devices by which a user may adjust and manipulate the displayed values, such as by including standard controls such as knobs, dials, buttons, switches, a keyboard, and so forth, instead of or in addition to a touchscreen display.

Further, the interface 122 may be configured to display and/or provide the option to adjust other values as suitable to different functions of the communication device and/or the FMF provided thereby. For example, a user may be able to control whether one or more adjusted flash intensity values should be re-used for image acquisition multiple times, and to what extent, such as by indicating a set amount of time during which the adjusted flash intensity values should continue to be used, or a number of shots by the camera, and so forth, or may simply instruct that the adjusted flash intensity value(s) should be used until the user indicates otherwise. In another example, the interface 122 may allow a user to retrieve a prior adjusted flash intensity value, or a prior calculated flash intensity value, from a previous session of image acquisition, such as in order to replicate lighting conditions used during the previous session, to further adjust the retrieved settings, to clear some settings, and so forth. Additional examples of information that the interface 122 may present to the user are mentioned below.

In some embodiments, every time a user makes an adjustment to a flash intensity value, the value of a variable corresponding to the flash intensity value, for example that is stored in a memory of device 120, may be automatically incremented to a corresponding extent. Optionally, in some embodiments, the interface 122 may provide an option by which the user may indicate that adjustment of the flash intensity value(s) is complete. Once the flash intensity value (s) are adjusted or otherwise approved or finalized by the user, the interface may provide an additional option for the user to save the flash settings to memory, or this may be an automatic procedure. The adjusted flash settings may be used during subsequent image acquisition by the camera.

Figure 3:
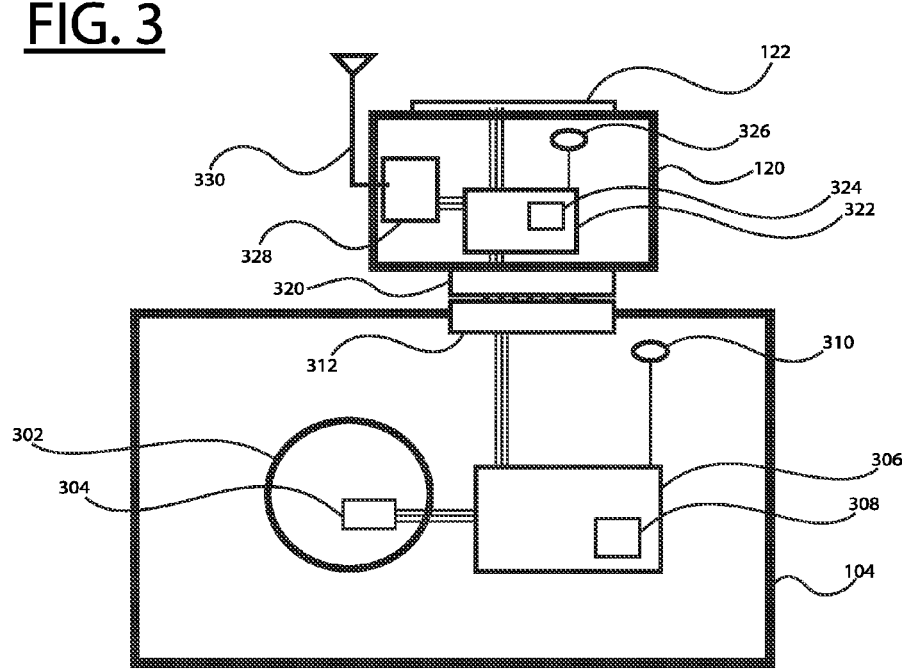
FIG. 3 is a schematic view illustrating the internal layout of various components of the communication device and camera of FIG. 1.

FIG. 3 schematically indicates an example layout of various structural and functional components of the illustrative embodiment of the communication device 120, as well as a simplified representation of components of the camera 104. Camera 104 is shown to include a lens element 302 that allows light to reach a light sensing element or light meter 304. The light meter is electrically connected to a microprocessor ("MCU") 306 of camera 104, which may include or otherwise communicate with a memory 308. The memory, which may be volatile random access memory, non-volatile memory, and so forth, is shown to be internal to MCU 306, but may be external thereto or otherwise arranged, and is configured to store data relating to camera operations, including flash settings such as exposure data gathered from a pre-flash, and so forth. Camera 104 is shown to further include a control 310, representing various operational controls that may be accessible to a user of the camera, such as buttons, dials, switches, and so forth, with control 310 electrically connected to MCU 306. Camera 104 is also shown to include a connector 312 in the form of a hotshoe connector, which may be used to electrically connect various signal or data lines of an external device coupled to the hotshoe connector (typically a flash unit) to communicate with MCU 306.

Although not required to all embodiments, communication device 120 is shown to include a corresponding connector 320 in the form of a hotshoe connector configured to mate with connector 312 of the camera 104. Connector 320 of the communication device 122 is electrically connected to an MCU 322 of the device that is shown to include a memory 324 configured to store data related to functions of the communication device, such as values and settings used by the FMF, including flash intensity values. The MCU 322 is also shown to be electrically connected to user interface 122, and the communication device may optionally include additional controls, indicated at 326, that are coupled to the MCU 322.

Although not shown in the schematic view presented in FIG. 3, camera 104 may also include various components common to commercially available cameras, such as a power source, an imaging sensor, a shutter or image capture control, and so forth.

Communication device 122 is also shown to include a radio module 328 electrically connected to an antenna element 330. In such an embodiment, the communication device 122 may transmit radio signals to other communication devices in the camera system, such as communication devices equipped with receiver units that are coupled with the remote flash devices. As indicated above, several example methods and devices for radio communication in a camera system are disclosed in Applicant's co-pending U.S. Patent Application Pub. No. US20100008658, which also describes the use of pseudo communications provided by the communication devices to a camera system participant (such as a flash device or camera), that are interpreted by the camera system participant as if the pseudo communications were actual communications that originated from another camera system participant. In such a manner, communication device 122 may mimic a flash device to which the camera 104 sends signals.

In this or any suitable manner, the communication device 122 may be configured, such as by means of the MCU 322, to obtain a calculated flash value intensity from camera 104. For example, the camera may intend to transmit various instructional signals to a connected flash device over the hotshoe connector (which, in a camera system that includes remote flash devices, may further be relayed to the remote flash devices optically by the connected flash device). However, the camera may not transmit any signals over the hotshoe connector unless it receives an indication from a device coupled to the hotshoe connector that the device is compatible with the camera. Thus, the communication device 122 may provide such an indication to the camera, for example by mimicking a compatible flash device, by means of a pseudo communication. As such, the camera may then proceed to transmit various signals, such as a signal for a pre-flash, a subsequent signal that includes a calculated flash value intensity (for example in a signal ordering the flash device to emit light at the calculated flash value intensity), and so forth, to what it recognizes as a flash device.

Once the communication device 122 has obtained one or more calculated flash intensity values from the camera, such as values that are used for an initial image acquisition, the user interface may display the values to the user for adjustment as indicated above. Once adjusted, the MCU 322 may accept the user-provided adjustment(s) of the one or more calculated flash intensity values from the camera and save the one or more adjusted flash intensity values in memory 324. The MCU 322 may then transmit the one or more adjusted flash intensity values (i.e., instead of the values calculated by the camera) to the respective flash devices of the camera system, such as flash devices 106, 108, and 110 of camera system 102, for use during subsequent image acquisition by the camera.

The timing and manner of the transmission of the adjusted flash intensity value(s) to the respective flash device(s) may be configured as desired. For example, the camera normally may be configured to signal a flash device to emit light at the calculated flash value intensity immediately prior to, or some time prior to, image acquisition, such as to ensure proper timing of the flash emission with the shutter position of the camera, to allow sufficient charge time for the flash devices, and so forth. As such, once a user has adjusted the flash intensity value, the communication device 122 may act as a signal relay during the subsequent image acquisition, except instead of relaying a calculated flash intensity value from the camera to the respective flash device, the communication device substitutes the adjusted flash intensity value, but using similar timing. Optionally, the communication device 122 may transmit the adjusted flash intensity value(s) according to a different timing protocol, as long as the adjusted flash intensity value(s) is/are received by the respective flash devices prior to subsequent image acquisition by the camera. Additionally, the manner of the transmission may be as appropriate to the flash devices in use in the camera system. For example, the communication device 122 is provided with an antenna and a radio module for radio communication, such as with receiver devices coupled with, and/or receiver modules integrated in, the flash devices, in which case the communications related to adjusted flash intensity values may be transmitted by radio. However, other embodiments may be configured to transmit signals optically, or via wired connections, and so forth, as appropriate to the flash devices. In some embodiments, then, the communication device may mimic a flash device (such as a master flash device coupled to the camera) in communicating the adjusted flash intensity values to the flash devices of the camera system.

With the foregoing explanation, an illustrative method of providing a FMF as described above, which may be embodied in and/or carried out by, for example, a communication device produced according to the present disclosure (such as communication device 120), such as by means of various software instructions by which a microprocessor (such as MCU 322 of communication device 120) is configured to execute, and/or a camera system that includes such a communication device, and/or other components configured to have functionality described above, so forth, may begin by obtaining, subsequent to image acquisition by a camera of a photographic subject, a calculated flash intensity value used by a flash device during the image acquisition and calculated by the camera from exposure data gathered by a light metering system employed by the camera, and then saving the calculated flash intensity value in a memory. The illustrative method may then proceed by making the calculated flash intensity value available to a user to be adjusted, then accepting a user-provided adjustment of the calculated flash intensity value, followed by saving the adjusted flash intensity value in a memory.

The illustrative method may then continue by providing, for use during subsequent image acquisition by the camera, the adjusted flash intensity value instead of the calculated flash intensity value. In some embodiments, the method may further include using the adjusted flash intensity value during image acquisition by the camera. In some embodiments the adjusted flash intensity is provided to a flash device by a communication device upon the camera signaling the calculated flash intensity value to the flash device, as mentioned above.

In some embodiments, making the calculated flash intensity value available to a user to be adjusted includes displaying the calculated flash intensity value to the user, such as via the touchscreen display 124 of communication device 120, and/or providing a user interface, such as the user interface 122 of communication device 120, by which the user may selectively adjust the calculated flash intensity value.

In the illustrative method, or in variations thereof, one or more additional steps, or actions, may be accomplished using the concepts and components discussed above, for example to achieve additional functionality of a FMF.

For example, a user may wish to continue using adjusted flash intensity values for several subsequent shots, without the camera signaling for pre-flashes and calculating flash intensity values prior to every shot. As such, the FMF may allow a user to selectively disable pre-flash procedures while an adjusted flash intensity value is being used, for example once a calculated flash intensity value is obtained from the camera. One way of accomplishing this may be to communicate to the camera, such as by means of a communication device such as communication device 120, that a flash device is in manual flash mode, for example by providing a pseudo communication to the camera as if it originated from the flash device. Some flash devices may be switched between an automatic (e.g. TTL) mode in which it is slaved to another device (typically, the camera), which provides the settings for flash operation, and a manual flash mode in which a user may set flash settings for the flash device. A flash device will typically signal to a camera when it is in manual flash mode, and the camera's typical response is to cease carrying out light metering operations (such as signaling a pre-flash, and so forth), and instead simply operate the flash device according to whatever flash settings a user provides. In this mode, a camera typically will not request, nor expect, pre-flashes until receiving an indication otherwise, such as a signal that the flash device is in automatic mode.

As such, some methods may involve, subsequent to using the adjusted flash intensity value during image acquisition by the camera, continuing to use the adjusted flash intensity value during subsequent image acquisition by the camera. Optionally, such methods may include, subsequent to obtaining the calculated flash intensity value used during the image acquisition, preventing the light metering system of the camera from gathering exposure data. As noted above, these methods may do so by indicating to the camera that the flash device is in a manual flash mode, such as after obtaining the calculated flash intensity from the camera or otherwise while an adjusted flash intensity value is in use.

In such embodiments, a FMF may revert to automatic (e.g. TTL) mode from manual flash mode, or otherwise re-enabling the camera's light metering system, automatically, for example after a certain period of time elapsing without further image acquisition or user input, when a user has cleared or deleted the adjusted flash intensity value that was being used, when the user makes an indication to switch from manual flash mode to automatic mode, and so forth. Other manners of communication modal switches may include making regular communications to the camera to update the modal condition, and so forth.

Another example of an optional function of a FMF is to continue to allow the camera to conduct pre-flash procedures or otherwise gather exposure data from which flash intensity values may be calculated, even after a user has adjusted a flash intensity value obtained from the camera, and monitor the difference between the adjusted flash intensity value being used and the calculated flash intensity values from the camera. This may be useful in certain situations in which an adjusted flash intensity value may no longer be an appropriate value to use, such as if lighting conditions change to such an extent that the adjusted flash intensity value may not yield a good photograph. For example, a user may be shooting multiple pictures of a particular subject under steady lighting conditions while using one or more adjusted flash intensity values, and then turn in another direction, such as to capture a photograph of a rapidly-developing situation, in which the adjusted flash intensity value may no longer be appropriate to the new lighting conditions. In such an example, if the camera conducts a pre-flash and calculates a flash intensity value for the new lighting conditions that differs from the adjusted flash intensity value currently being used by, for example, an amount that is greater than a predetermined threshold amount, a FMF may provide an override by substituting the newly-calculated flash intensity value for the adjusted flash intensity value. This threshold amount may be a value set by the user, and/or may be programmed into the communication device, and so forth.

As such, some methods may include obtaining, from the camera, a second calculated flash intensity value based on exposure data gathered from a pre-flash procedure conducted after obtaining the first calculated value from the camera and/or providing the adjusted flash intensity value to the flash device, and substituting, when the difference between the adjusted flash intensity value and the second calculated flash intensity value is greater than a predetermined threshold amount, the second calculated flash intensity value for the adjusted flash intensity value. The second calculated flash intensity value may then be used for image acquisition.

The FMF threshold-override function described above may further include variations, such as exceptions in which a calculated flash intensity value is not substituted for the adjusted flash intensity value in use, even when the difference therebetween may be greater than a predetermined threshold. Two example exceptions are when a newly-calculated flash intensity value calls for maximum flash (e.g., if lighting conditions are completely dark) or a minimum flash (e.g., if lighting conditions are extremely bright). An example of the latter condition may be one in which the user briefly passes the camera in front of a light at the same time that the camera is conducting a pre-flash procedure. Because this is generally an anomaly and/or a transitory condition, it may be appropriate to ignore a flash value intensity calculated based on it, and instead continue to use the adjusted flash intensity value.

The optional FMF functions discussed above may be accomplished by means of a communication device constructed in accordance with the present disclosure, such as communication device 120. For example, the FMF pre-flash disable function may be realized with MCU 322 of communication device 120, such as if it is configured to prevent the camera from gathering exposure data subsequent to obtaining a calculated flash intensity value from the camera, such as by signaling to the camera that the flash device is in manual flash mode. The FMF threshold-override function may be realized by configuring MCU 322 to monitor subsequent flash intensity values calculated by the camera for the flash device based on exposure data gathered subsequent to storing an adjusted flash intensity value to the memory, and to signal the flash device, instead of to emit light at the adjusted flash intensity value, to emit light at a selected subsequent flash intensity value that differs from the adjusted flash intensity value by an amount greater than a predetermined threshold.

Returning to FIG. 1, an example user experience using a FMF as provided by the communication device 120 with camera system may proceed as follows: after the user sets up the flash devices and is ready to begin shooting, the communication device 120 may begin by signaling to the camera that it is a flash device in automatic mode. As such, when the user activates the camera for image acquisition, a pre-flash for each flash device is requested by the camera, followed by calculation of flash intensity values for each flash device based on exposure data gathered by the camera's light metering system, followed by near-immediate signaling, by the camera, to the flash devices to emit light at the calculated flash intensity values for image acquisition. At this point, the calculated flash intensity values may be captured, or otherwise obtained, as noted above, and may be displayed to the user via user interface 122. Optionally, the communication device may signal to the camera that the flash devices are now in manual mode, such as to prevent the camera from requesting further pre-flashes. The user may then adjust one or more of the values, or accept all of the values without adjustment. The adjusted (or approved) values are saved to memory, and provided to the flash devices when the user next activates the camera, and may be used for as many subsequent shots as the user desires, for example until the user clears the adjusted values (in which case the communication device may then signal to the camera that the flash devices are again in automatic mode, such as to re-enable the light metering functionality of the camera for the next shot). Or, instead of signaling to the camera that the flashes are in manual mode once the flash intensity values are obtained from the camera, the communication device may instead allow the camera to continue as if the flash devices remain in automatic mode, that is, every time the user activates the camera, it will conduct a pre-flash procedure or otherwise utilize the light metering system to gather exposure data and calculate flash intensity values, even though the user may have adjusted the initial calculated flash intensity values obtained from the camera. In this case, the communication device may monitor the difference between the user-adjusted flash intensity value(s) and those calculated by the camera immediately prior to each shot, and automatically substitute one or more calculated flash intensity values anytime the difference between an adjusted flash intensity value and a calculated flash intensity value is greater than a predetermined threshold.

As noted above, use of a communication device or similar external module to accomplish the various aspects and functions of a FMF is one illustrative embodiment of a device that may facilitate the FMF in a camera system. Another illustrative embodiment is a camera that may be configured to include a FMF, such as by means of components configured to accomplish the various functions described herein in order to provide the FMF.

Figure 4:
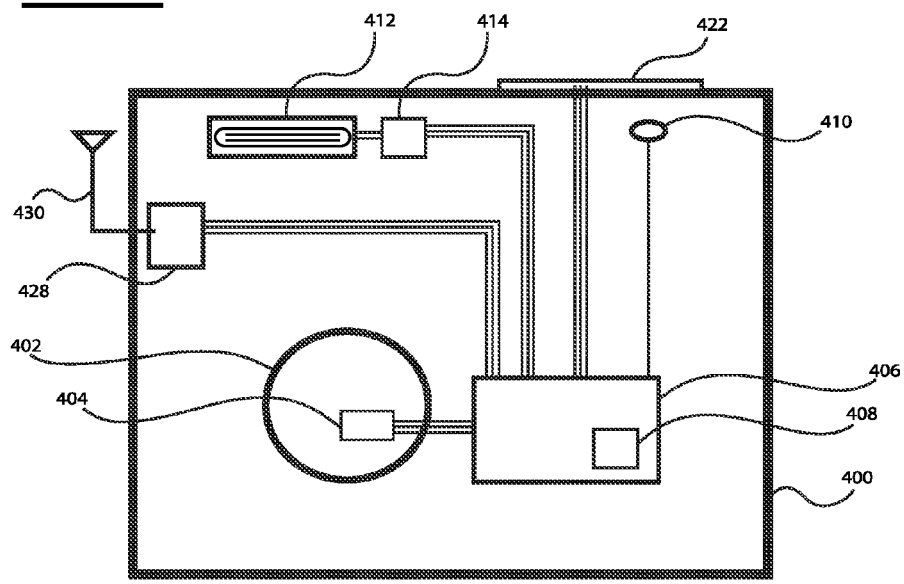
FIG. 4 is a schematic view illustrating the internal layout of various components of a camera configured to provide a FMF in accordance with aspects of the present disclosure.

An example layout of various structural and functional components of an illustrative embodiment of such a camera is shown in FIG. 4 as camera 400. Camera 400 is shown to include a lens element 402 that allows light to reach a light sensing element or light meter 404, which is electrically connected to a microprocessor ("MCU") 406, which may include or otherwise communicate with a memory 408. The memory may be configured to store data relating to camera operations as well as pre-flash operations and other data related to aspects of the FMF, including flash settings such as exposure data gathered from a pre-flash, calculated flash intensity values, user-adjusted flash intensity values, and so forth, and so forth. Camera 400 is shown to further include a control 410, representing various operational controls that may be accessible to a user of the camera, such as buttons, dials, switches, and so forth, with control 410 electrically connected to MCU 406.

Although not required to all embodiments, camera 400 is also shown to include a flash device 412, such as a xenon tube or the like, electrically coupled to the MCU 406 via a control and charging circuit 414 for the flash device. Further, camera 400 includes a user interface 422 that is electrically connected to the MCU 406, and which may include a display and otherwise be configured similarly to user interface 122 of communication device 120. Camera 400 may further include a radio module 428 electrically connected to an antenna element 430.

Camera 400 may be configured to provide a FMF as follows. The light meter 404 may be configured to gather exposure data related to a photographic subject resulting from a pre-flash emission of the flash device 412 (or another flash device, such as a flash device remote from and in communication with the camera), and the MCU 406 may calculate based thereon a first flash intensity value for image acquisition of the subject by the camera. The memory 408 may be configured to store the calculated flash intensity value. As noted above, the user interface may be configured to display and allow the user to selectively adjust the first calculated flash intensity value. The MCU 406 may then store the adjusted flash value in the memory, for use in image acquisition by the camera, by signaling the flash device to emit light at the adjusted flash value instead of the first calculated flash intensity value.

In the illustrative "in-camera" embodiment shown in FIG. 4, one or more optional functions of the FMF, such as those discussed above, may be enabled. For example, a threshold-override function may be provided by configuring the MCU 406 to calculate a second flash intensity value based on a pre-flash emission of the flash device subsequent to storing the adjusted flash intensity value, compare the difference between the adjusted flash intensity value and the second calculated flash intensity value, and signal the flash device to emit light at the second calculated flash intensity value when the difference is greater than a predetermined threshold value, or at the adjusted flash intensity value otherwise. A pre-flash disable function for the flash device 412 may be provided by configuring the MCU 405 to selectively prevent the light meter from gathering exposure data subsequent to storing the adjusted flash intensity value in the memory, or prevent the charging circuit 414 from powering the flash device 412.

Several variations may be made to a communication device or similar external module that may accomplish or otherwise facilitate the various aspects and functions of a FMF in a camera system, or to a camera that incorporates components configured to accomplish or facilitate a FMF as described in the present disclosure. For example, an external communication device may physically couple with a camera in a manner other than via the hotshoe connection, such as via a cable or other wired connection, or may be physically remote from the camera. Further, the various components of a communication device or camera need not be housed in a single unit as shown; other embodiments may, for example, provide a display on a separate device capable of displaying an output, such as a computer, a laptop, a PDA, a call phone, and so forth, accept input from separate devices such as keyboards, a hand-held remote control device, and so forth, utilize devices equipped with touchscreen displays such as tablet computers and some smartphones, and the like. Memory may be additionally or alternatively provided and/or shared in the form of removable media such as flash drives, CDs, nonlocal means such as cloud storage, etc.

Figure 5:
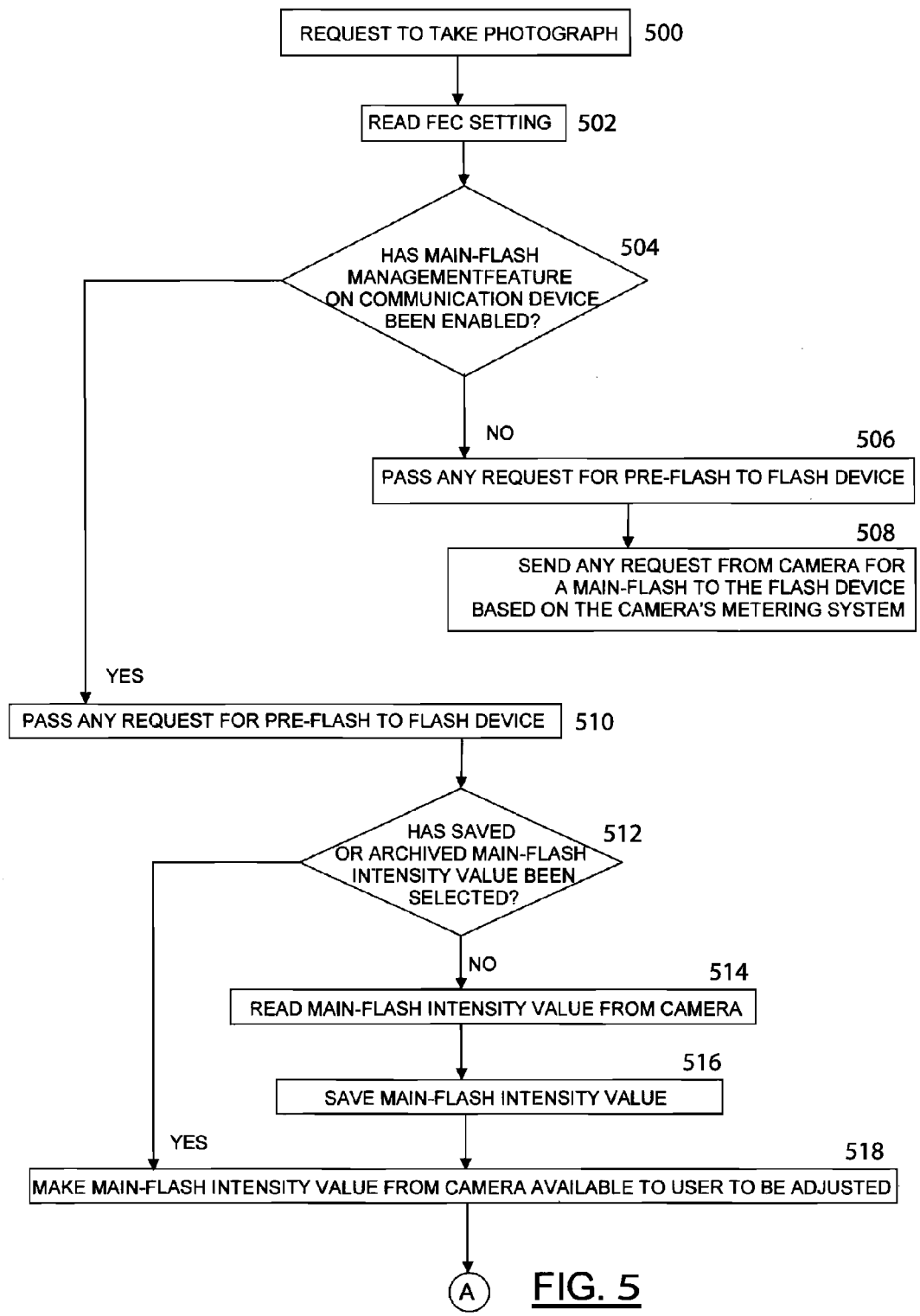
FIGS. 5-7 are portions of a flow diagram illustrating an example process followed in the provision of a FMF in accordance with the present disclosure.
Figure 6:
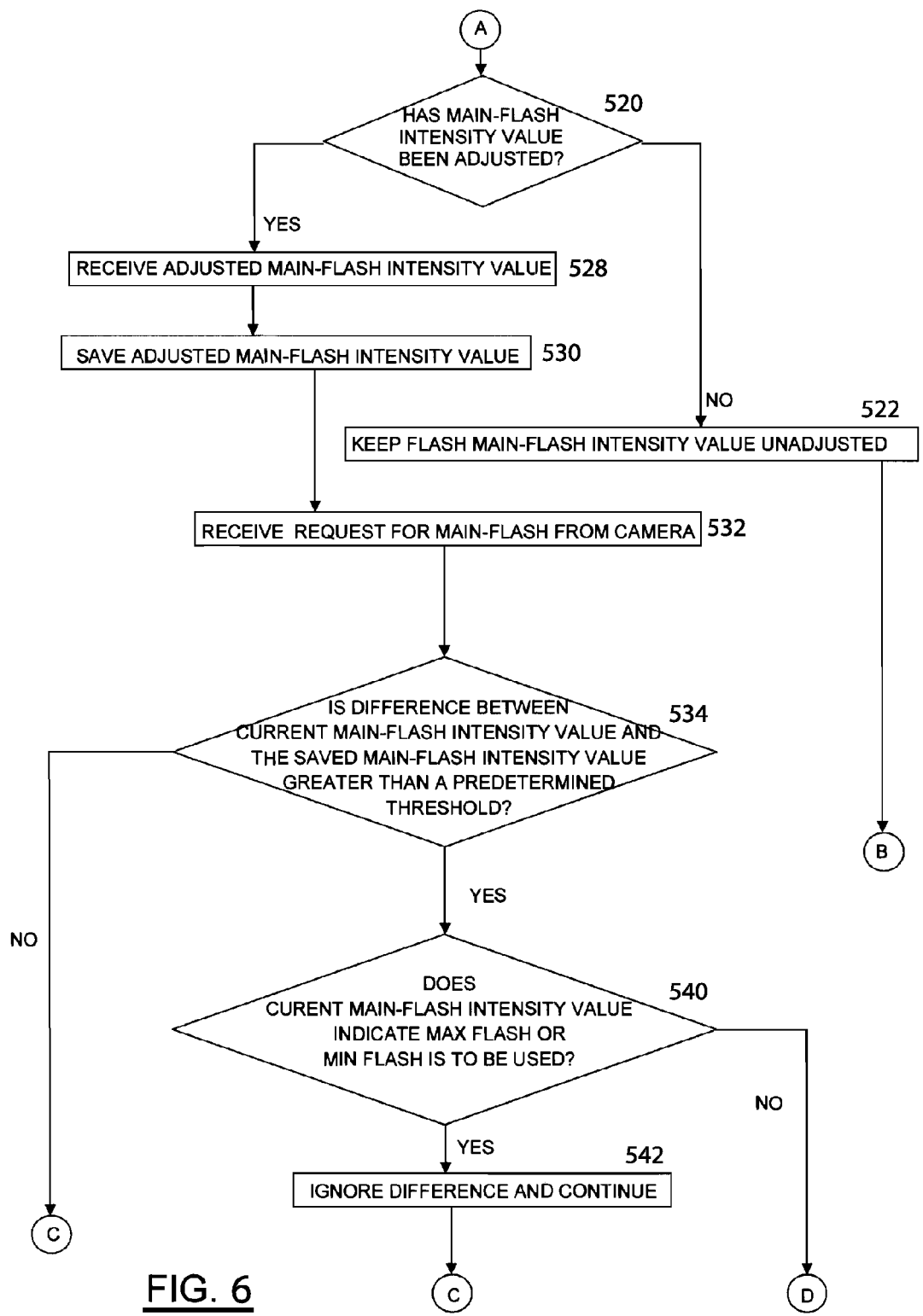
Figure 7:
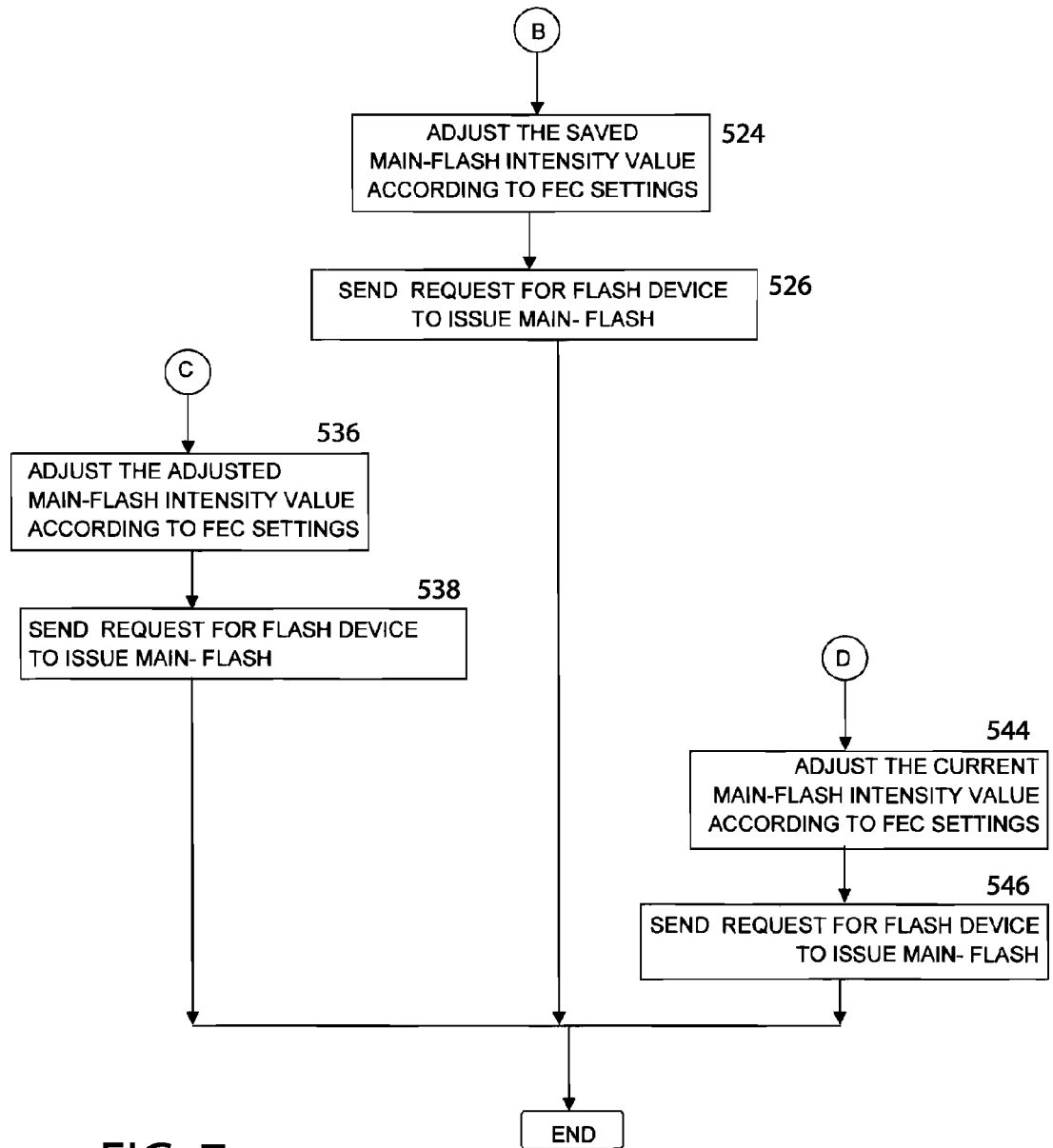

An example process, such to represent an example flow of operations by, for example, a microprocessor (such as MCU 322) of a communication device (such as communication device 120) configured to provide a FMF in a camera system that includes a camera and a flash device, is shown in FIGS. 5-7, with the threshold-override feature. In the example process, the camera and the flash both begin in a TTL (such as E-TTL) mode. At 500 in FIG. 5, a request to take a photograph by the camera is received. At 502, the FEC setting (if any) is read. At 504, it is determined whether the FMF has been enabled, such as by a user. If not, requests for pre-flash are relayed to the flash device (506), and requests from the camera for a main flash at the flash intensity value calculated by the camera are also relayed to the flash device. However, if the FMF is enabled, requests for pre-flash are related to the flash device (510), and then it is determined, at 512, if the user has selected a stored (e.g., saved or archived) flash intensity value. If not, then the calculated flash intensity value is read from the camera, at 514, saved, at 516, and then made available to the user to be adjusted, at 518. However, if the user had selected a stored flash intensity value, this value is made available to the user to be adjusted, at 518.

It is then determined, at 520 (FIG. 6) whether the flash intensity value presented to the user has been adjusted. If not, the flash intensity value is kept unadjusted, at 522, then adjusted according to FEC settings (if any) at 524 (in FIG. 7), and then sent to the flash device for use during image acquisition, at 526. However, returning to FIG. 6, if the flash intensity value was adjusted at 520, the adjusted flash intensity value is received, such as by the MCU 322 (at 528), then stored, at 530. When a request for a flash emission is received from the camera, at 532, it is then determined, at 534, whether the difference between the current (e.g., the most recently calculated) flash intensity value and the adjusted flash intensity value is greater than a predetermined threshold. If the determination is that it is not, in FIG. 7, the adjusted flash intensity value is (further) adjusted according to FEC settings (if any) at 536, and then sent to the flash device for use during image acquisition, at 538. Returning to FIG. 6, if it is determined instead that the difference between the current flash intensity value and the adjusted flash intensity value is greater than a predetermined threshold, the FTF threshold-override function may be triggered, by determining, at 540, whether the current flash intensity value indicates that the maximum or minimum flash intensity is to be used. If the answer is yes, signifying an exception to the threshold-override, the difference is ignored, at 542, and the process continues by using the adjusted flash intensity value, and concludes by (further) adjusting the value according to FEC settings (if any) at 536, and then sent to the flash device for use during image acquisition, at 538. If the answer is no, that is, if the current flash intensity value does not indicate that the maximum or minimum flash intensity is to be used, then the current flash intensity value is used instead, and the process concludes by adjusting the current flash intensity value according to FEC settings (if any) at 544 (in FIG. 7), and then sent to the flash device for use during image acquisition, at 546.

In the foregoing disclosure, the present invention has been described with reference to specific illustrative embodiments, methods, processes, and other examples, and selected variants thereof. It will be apparent to those skilled in the art that various modifications and changes may be made, however, without departing from the scope of the present invention as set forth in the claims. The specification and drawings are provided for illustrative purposes, rather than to restrict or limit any aspect of the scope of the disclosure. The present invention is intended to embrace all such alternatives, modifications and variances that fall within the scope of the appended claims.

For example, the steps, actions, or events recited in any of the methods or processes disclosed and/or claimed herein may be executed in any order and may not be limited to the specific order presented. Additionally, components and/or elements presented and/or claimed in any apparatus, device, component herein may be assembled or otherwise operationally configured in a variety of permutations and accordingly may not be limited to the specific configuration(s) presented.

Further, benefits, other advantages, and solutions to problems or challenges may be described herein with regard to particular embodiments, however, any such benefit, advantage, solution, or any element that may enhance or cause any particular benefit, advantage, or solution to occur are not to be construed as critical, required, or essential features or components of the invention, nor should the claims be construed as exclusively addressing such benefits, advantages, or solutions.

I claim:

1. A method, comprising:
   obtaining, subsequent to image acquisition by a camera of a photographic subject, a calculated flash intensity value used by a flash device during the image acquisition and calculated by the camera from exposure data gathered by a light metering system employed by the camera;
   saving the calculated flash intensity value in a memory;
   making the calculated flash intensity value available to a user to be adjusted;
   accepting a user-provided adjustment of the calculated flash intensity value;
   saving the adjusted flash intensity value in a memory; and
   providing, for use during subsequent image acquisition by the camera, the adjusted flash intensity value to the flash device instead of the calculated flash intensity value.

2. The method of claim 1, wherein providing the adjusted flash intensity value to the flash device is performed upon the camera signaling the calculated flash intensity to the flash device.

3. The method of claim 1, wherein obtaining the flash intensity value includes mimicking the flash device.

4. The method of claim 1, further comprising:
   providing to the flash device, subsequent to image acquisition using the adjusted flash intensity value, a different flash intensity value that is different from the adjusted flash intensity value for image acquisition by the camera; and
   retrieving, subsequent to image acquisition using the different flash intensity value, the adjusted flash intensity value from memory; and
   re-using the adjusted flash intensity value during image acquisition by the camera.

5. The method of claim 1, wherein making the calculated flash intensity value available to a user to be adjusted includes displaying the calculated flash intensity value to the user.

6. The method of claim 5, wherein accepting a user-provided adjustment of the calculated flash intensity value further includes providing a user interface by which the user may selectively adjust the calculated flash intensity value.

7. The method of claim 1, wherein the light metering system of the camera gathers exposure data by operating the flash device in a pre-flash procedure.

8. The method of claim 1, further comprising:
   preventing the light metering system of the camera from gathering exposure data subsequent to obtaining the calculated flash intensity value used during the image acquisition.

9. The method of claim 8, wherein preventing the light metering system of the camera from gathering exposure data includes indicating to the camera that the flash device is in a manual flash mode.

10. The method of claim 8, further comprising:
    subsequent to using the adjusted flash intensity value during image acquisition by the camera, continuing to use the adjusted flash intensity value during subsequent image acquisition by the camera.

11. The method of claim 7, wherein the calculated flash intensity value is a first calculated flash intensity value, and wherein the method further comprises:
    obtaining, from the camera, a second calculated flash intensity value calculated by the camera from exposure data gathered by the light metering system subsequent to obtaining the first calculated flash intensity value from the camera;
    when the difference between the adjusted flash intensity value and the second calculated flash intensity value is greater than a predetermined threshold amount, providing the second calculated flash intensity value to the flash device for use during subsequent image acquisition by the camera; and
    when the difference between the adjusted flash intensity value and the second calculated flash intensity value is not greater than a predetermined threshold amount, preventing the second calculated flash intensity value from being provided to the flash device.

12. A communication device for use with a camera system having a camera and a flash device, in which the camera is configured to gather exposure data related to a photographic subject, calculate therefrom a flash intensity value for the flash device, and signal the flash device to emit light at the calculated flash intensity during subsequent image acquisition of the photographic subject by the camera, the communication device comprising:
    a microprocessor adapted to obtain a calculated flash intensity value from the camera;
    a memory operably coupled to the microprocessor;

a user interface configured to:
  display the calculated flash intensity value; and
  allow a user to selectively adjust the calculated flash intensity value;
wherein the microprocessor is configured to:
  store an adjusted flash intensity value in the memory; and
  signal the flash device to emit light at the adjusted flash intensity value during subsequent image acquisition by the camera.

13. The communication device of claim 12, further comprising a hotshoe connector configured to couple with a corresponding hotshoe connector of the camera.

14. The communication device of claim 13, wherein the camera signals the flash device by means of the hotshoe connector, and wherein the microprocessor obtains the calculated flash intensity value by detecting the signal transmission over the hotshoe connector.

15. The communication device of claim 12, wherein the microprocessor is further configured to communicate with the camera as if the communication device was the flash device.

16. The communication device of claim 15, wherein the microprocessor is further configured to prevent the camera from gathering exposure data subsequent to obtaining a calculated flash intensity value from the camera.

17. The communication device of claim 16, wherein the microprocessor prevents the camera from gathering exposure data by signaling to the camera that the flash device is in manual flash mode.

18. The communication device of claim 12, wherein the microprocessor is further configured to:
  monitor subsequent flash intensity values calculated by the camera for the flash device based on exposure data gathered subsequent to obtaining a calculated flash intensity value from the camera; and
  signal the flash device, instead of to emit light at the adjusted flash intensity value, to emit light at a subsequent flash intensity value that differs from the adjusted flash intensity value by an amount greater than a predetermined threshold.

19. A camera for use with a flash device, the camera comprising:
  a light meter configured to gather exposure data related to a photographic subject resulting from a pre-flash emission of the flash device;
  a microprocessor configured to calculate, based on the exposure data, a first flash intensity value for the flash device for image acquisition of the photographic subject by the camera;
  a memory operably coupled to the microprocessor and configured to store the calculated flash intensity value; and
  a user interface configured to:
    display the first calculated flash intensity value; and
    allow a user to selectively adjust the first calculated flash intensity value;
  wherein the microprocessor is further configured to:
    store the adjusted flash intensity value in the memory;
    calculate a second flash intensity value based on a pre-flash emission of the flash device subsequent to storing the adjusted flash intensity value;
    compare the difference between the adjusted flash intensity value and the second calculated flash intensity value; and
    signal the flash device, during subsequent image acquisition by the camera, to emit light at the second calculated flash intensity value when the difference is greater than a predetermined threshold value, or at the adjusted flash intensity value otherwise.

20. The camera of claim 19, wherein the microprocessor is further configured to selectively prevent the light meter from gathering exposure data subsequent to storing the adjusted flash intensity value in the memory.

* * * * *